United States Patent [19]

Adleman

[11] 4,380,871

[45] Apr. 26, 1983

[54] MECHANICAL PUNCH DRIVER

[75] Inventor: Larry G. Adleman, Rockford, Ill.

[73] Assignee: Ex-Cell-O Corporation, Troy, Mich.

[21] Appl. No.: 272,451

[22] Filed: Jun. 11, 1981

[51] Int. Cl.³ ............................................. B26F 1/32
[52] U.S. Cl. ................................................... 30/360
[58] Field of Search ......................... 30/361, 360, 358; 29/264, 256

[56] References Cited

U.S. PATENT DOCUMENTS

| | | |
|---|---|---|
| 1,929,245 | 10/1933 | Harvey . |
| 2,113,087 | 4/1938 | Jensen . |
| 2,221,904 | 11/1940 | Abramson ............................ 30/360 |
| 2,633,197 | 3/1953 | Nischan ................................ 30/360 |
| 3,028,987 | 4/1962 | Van Hecke . |
| 3,269,011 | 8/1966 | Herrstrum ............................ 30/360 |
| 3,564,716 | 2/1971 | Burrows ............................... 30/360 |

Primary Examiner—Jimmy C. Peters
Attorney, Agent, or Firm—John C. Evans; Edward J. Timmer

[57] ABSTRACT

A mechanical knock-out punch driver has a torque housing that has a recirculating ball screw unit rotatably supported therein. A driver collar is connected to a rotatable handle to direct a rotary input force to a nut portion of the ball screw unit so as to drive the screw portion of the ball unit and a draw stud connected thereto axially and linearly without rotation. A draw punch is pulled by the non-rotating draw stud to cut a slug of material from a sheet material panel to produce a clearance hole for the passage of electrical conduit, tubing, piping or the like.

6 Claims, 3 Drawing Figures

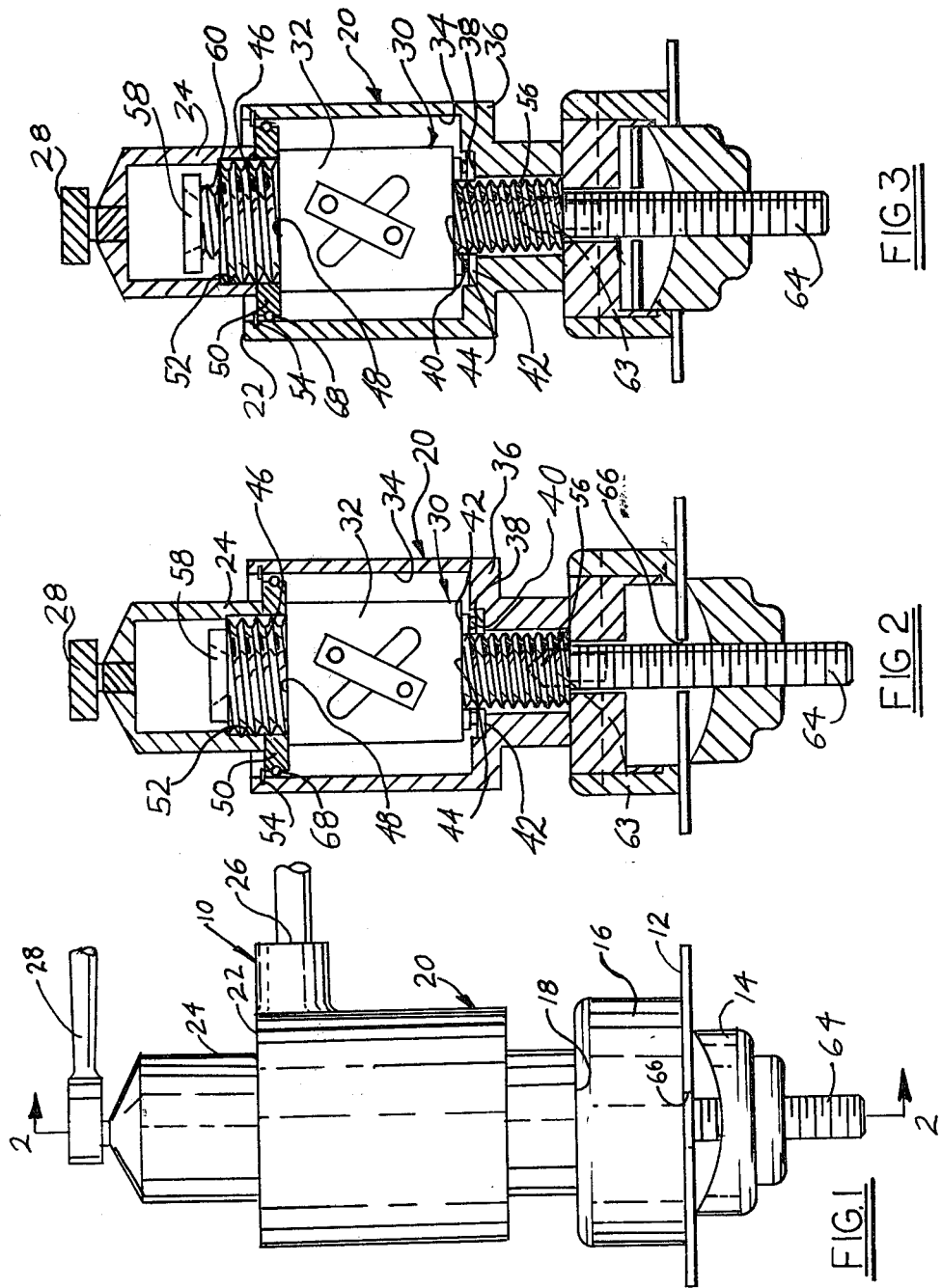

MECHANICAL PUNCH DRIVER

TECHNICAL FIELD

This invention relates to mechanical drivers for punching sheet material and more particularly to such drivers having a draw stud for operating the punch.

BACKGROUND OF THE PRIOR ART

Prior art knock-out punch drivers have included a housing with a stationary nut enclosing a non-recirculating ball assembly through which an input shaft is rotated to produce both rotation and axially linear movement of an output draw stud. The draw stud pulls an attached punch through the sheet material. In such arrangements the punch does not rotate during rotation of the draw stud. As a result, frictional drag is produced between the punch threads and threads on the rotating draw stud. Such drag requires higher driver input forces to pull the punch through the sheet material. Further, the balls of the screw are subject to high compressive forces and Brinnelling. This requires use of large diameter balls and resultant larger ball screw raceway pitch.

DISCLOSURE OF THE INVENTION

An object of the present invention is to improve such ball screw, draw stud type knock-out punch drivers by the provision therein of means for reducing the operating force required to uniformly draw a punch of a knock-out set through sheet material including heavier gauge metal panels.

Another object of the present invention is to improve mechanical drivers for operating knock-out punches by the provision of a thrust housing enclosing a recirculating ball screw unit having a nut portion supported for rotation with respect to the thrust housing and wherein means are included to rotate the nut portion to produce a non-rotative axial movement of an associated screw thereby to prevent rotation of an output draw stud within the threads of a knock-out punch so as to reduce input force requirements.

Another object of the invention is to provide a knock-out punch driver as set forth in the preceding object wherein the diameter of the individual balls is reduced and the pitch of the ball screw raceway is reduced commensurately to increase the mechanical advantage of the knock-out punch driver to further reduce input force levels required to punch through heavier gauge thickness sheet material.

A further object is to provide a knock-out punch driver as set forth in the preceding object wherein means are included to frictionally couple the nut and thrust housing to prevent the screw from backing off as the nut is step rotated with respect to the housing.

A still further object is to provide a knock-out punch driver as set forth in the preceding object wherein means are included at an output end of the thrust housing to eliminate bearing wear and resultant punch wobble.

These and other objects of the present invention are attained in one working embodiment which includes a thrust housing. The housing encloses a recirculating ball screw unit with a retaining ring seated on one end of its nut portion and held in place by a driver collar threaded to the nut portion. Operating handles are connected to the thrust housing and driver collar. They are rotated relative to one another to produce a stepped rotation of the nut portion which pulls the shaft of the unit axially without rotation. A draw stud on which a punch is threaded will pull the punch into a die seated on the output end of the housing without frictional drag between the threads of the punch and the draw stud thereby reducing input load requirements and thus increasing the gauge of sheet material which can be pierced by the punch.

These objects and features will be apparent from the following description, reference being had to the accompanying drawings wherein a preferred embodiment of the present invention is clearly shown.

BRIEF DESCRIPTION OF THE DRAWINGS

FIG. 1 is a view in elevation of a knock-out punch driver shown in association with a punch and die in place on sheet material to be knocked out.

FIG. 2 is a longitudinal sectional view taken along the line 2—2 of FIG. 1 looking in the direction of the arrows.

FIG. 3 is a view like FIG. 2 showing the component parts positioned following knock-out.

BEST MODE OF CARRYING OUT THE INVENTION

In FIG. 1, a knock-out punch driver 10, in accordance with the present invention, is mounted on a panel 12 of heavy gauge sheet material. The panel 12 is located between a punch 14 of the type set forth more specifically in U.S. Ser. No. 059,869, filed July 23, 1979 to Wayne Lindquist et al. for Draw Punch and with a common assignee as in the present case. The punch 14 is aligned with a die 16 seated against the output end 18 of a thrust housing 20. The input end 22 of housing 20 is opened and receives a driver collar 24.

Operating handles 26, 28 are connected to the input end 22 and to the driver collar 24, respectively, and are relatively rotated to pull the punch 14 through the panel 12.

One feature of the present invention is an improved transfer of input force from driver collar 24 to punch 14 which reduces the amount of input force required to pull the punch through a sheet metal panel. The transfer is accomplished by a recirculating ball screw unit 30 having a nut 32 seated within thrust housing 20 and located in spaced relationship to the inner surface 34 of upper end 22.

An annular end wall 36 between the input and output ends 22, 18 has a bearing seat 38 formed therein supporting a thrust bearing 40. The inboard race 42 of bearing 40 supports the output end 44 of nut 32 across substantially its full diameter to stabilize the ball screw unit 30 during operation of the driver 10.

The input end 46 of nut 32 is externally threaded. It extends axially outwardly of a nut shoulder 48 which supports a retainer ring 50. The driver collar 24 has an internally threaded open end 52 threaded on input end 46 to hold retainer ring 50 securely against nut 32 for rotation therewith. A snap ring 54 holds the parts assembled so that nut 32 will be supported by bearing 40 and will be captured within input end 22. The supported nut 32 is free to rotate relative to thrust housing 20.

The screw 56 of ball screw unit 30 has a drive screw travel stop 58 on its input end 60 which limits its axial movement within nut 32. The output end 62 of screw 56 has a tapped bore 63 which threadably connects to the end of a draw stud 64.

The draw stud 64 extends through a pre-formed hole 66 in the panel 12. The punch 14 is threaded on to the draw stud 64 to hand tighten the punch 14 against one face of the panel 12. The opposite face of the panel 12 will thereby be securely seated against the die 16.

At this point all the parts are aligned for a draw punch operation to knock out a torus of material from the sheet material of panel 12.

An O-ring 68 is carried by retainer ring 50. The outside diameter of O-ring 68 engages inner surface 34 of housing 20. The O-ring 68 is formed of an elastomeric material which produces frictional drag between the nut 32 as it rotates with respect to thrust housing 20 to prevent back-off of the nut 32 as it pulls draw stud 64 axially inwardly of thrust housing 20 during operation of the knock-out punch driver 10.

In one working embodiment the recirculating ball screw unit is Model No. R-45 supplied by Rockford Ball Screw Co. of Rockford, Illinois 61109. The pitch diameter of one working model is 1.150 inches (2.92 cm). The aforedescribed construction of knock-out punch driver 10 enables reduced ball diameters and consequently reduced pitch diameters of the ball screw unit 30. Accordingly, the punch driver 10 is capable of developing substantial linear forces. For example, in one working embodiment forty-seven (47) foot pounds (209.06 N) of torque will produce a resultant linear force of eleven thousand (11,000) pounds (48.93 KN) using a two-inch (5.08 cm) punch of the type set forth in the aforesaid co-pending U.S. Ser. No. 059,869.

During operation, the handle 28 is rotated with respect to handle 26. The nut 32 is rotated within housing 20 to pull screw 56 and attached stud 64 and punch 14. The stud 64 moves axially and linearly and does not rotate with respect to the threads of punch 14.

Elimination of rotational frictional drag between draw stud 64 and the threads of punch 14 and the reduced pitch of recirculating ball screw unit 30 reduces the input force for various punch operations to less than one half of the force required to operate the previously described knock-out punch drivers.

Another feature of the aforesaid knock-out punch driver 10 is that the thrust bearing 40 is located both axially and laterally of thrust housing 20 to control deflection of the draw stud 64 so as to prevent misalignment of the punched hole during the knock-out operation.

The unit produces pull of the punch 14 and non-rotative, axial linear movement of both the ball nut screw 56 and the connected draw stud 64. Consequently, draw stud 64 can be either right or left hand threaded depending upon the die punch threading. In either case, the mechanical knock-out punch of the present invention will translate rotational input force into an axial output shaft movement without rotation. Such output shaft movement pulls a knock-out punch through sheet metal, plastic or other sheet construction material to produce a clearance hole for the passage of electrical conduit, tubing, piping or the like.

INDUSTRIAL APPLICABILITY

It is apparent from the foregoing that the invention provides an improved, easily operated hand held mechanical punch driver for knock-out of panel slugs from heavier gage sheet material.

While a preferred embodiment is shown, other modifications thereof are possible.

What is claimed is:

1. A mechanical operator for driving a punch through sheet material to remove a slug therefrom so as to form a clearance hole in the sheet material comprising a thrust housing, a recirculating ball screw unit having a screw and a rotatable nut, means for supporting said rotatable nut within said thrust housing for rotation with respect thereto, input drive means including a pair of relatively rotatable operating handles for producing a rotative input force on said rotatable nut to cause non-rotative axially linear movement of said screw, a draw stud secured to said screw and conjointly moveable therewith, said draw stud having a threaded end receiving the punch to pull the punch through the sheet material while eliminating frictional thread drag between the punch and the draw stud.

2. In the combination of claim 1, said input drive means including a driver collar fixed to said rotatable nut, said driver collar defining a space to accommodate non-rotatable axially linear movement of said screw as the draw stud pulls the punch through the sheet material.

3. In the combination of claim 1, said input drive means including a retainer ring fixedly secured to said nut and means for producing frictional drag between said retainer ring and said thrust housing to prevent back-off of said nut as it is rotated with respect to said thrust housing.

4. In the combination of claim 1, said input drive means including a retainer ring seated on said nut, a driver collar secured to said nut to fixedly secure said retainer ring to said nut, said driver collar defining a space for movement of said screw as the punch is drawn through the sheet material.

5. In the combination of claim 1, said input drive means further including means for producing a frictional drag between said retainer ring and said thrust housing to prevent back-off of said nut as it is rotated with respect to said thrust housing.

6. A mechanical operator for driving a punch through sheet material to remove a slug therefrom so as to form a clearance hole in the sheet material comprising a thrust housing, a recirculating ball screw unit having a screw and a rotatable nut, means for supporting said rotatable nut within said thrust housing for rotation with respect thereto, input drive means including a pair of relatively rotatable operating handles for producing a rotative input force on said rotatable nut to cause non-rotative axially linear movement of said screw, a draw stud secured to said screw and conjointly moveable therewith, said draw stud having means thereon connectable to the punch to pull the punch through the sheet material without relative movement between the punch and draw stud thereby to eliminate frictional drag between the punch and the draw stud.

* * * * *